United States Patent [19]
Liautaud

[11] Patent Number: 5,217,183
[45] Date of Patent: Jun. 8, 1993

[54] CANTILEVERED HELICOPTER SKID

[76] Inventor: James Liautaud, 132 E. Delaware Pl., No. 6601, Chicago, Ill. 60611

[21] Appl. No.: 735,058

[22] Filed: Jul. 24, 1991

[51] Int. Cl.$^5$ ............................................. B64C 25/52
[52] U.S. Cl. ..................... 244/108; 244/100 R; 244/104 R; 244/104 LS
[58] Field of Search ............... 244/108, 180 R, 104 R, 244/105, 17.17, 104, 104 LS; 280/28

[56] References Cited

U.S. PATENT DOCUMENTS

| | | | |
|---|---|---|---|
| Re. 18,002 | 3/1931 | De La Cierva | 244/100 R |
| D. 170,193 | 8/1953 | Green | D34/14 |
| 1,025,941 | 5/1912 | Arnoux | 244/108 |
| 1,358,603 | 11/1920 | Zahm | 244/100 R |
| 1,362,511 | 12/1920 | Roe | 244/100 R |
| 1,872,811 | 8/1932 | Reel | 244/100 R |
| 2,192,881 | 3/1940 | De Bothezat | 244/108 |
| 2,340,080 | 1/1944 | Ringnel | 244/108 |
| 2,492,965 | 1/1950 | Carrnel | 244/108 |
| 3,104,084 | 9/1963 | Lovercheck | 244/100 R |
| 3,841,656 | 10/1974 | Kramb et al. | 280/150 R |
| 4,196,878 | 4/1980 | Michel | 244/108 |
| 4,215,833 | 8/1980 | Chan | 244/17.11 |

FOREIGN PATENT DOCUMENTS

| | | | |
|---|---|---|---|
| 1123924 | 2/1962 | Fed. Rep. of Germany | 244/108 |
| 0782793 | 6/1935 | France | 244/108 |

Primary Examiner—Joseph F. Peters, Jr.
Assistant Examiner—Christopher P. Ellis
Attorney, Agent, or Firm—Trexler, Bushnell, Giangiorgi & Blackstone, Ltd.

[57] ABSTRACT

A landing apparatus for use with helicopters comprises a substantially J-shaped cantilevered landing skid having a cantilevered portion and a mounting portion. The cantilevered portion is attached at one end thereof to the mounting portion and extends substantially perpendicularly away the mounting portion. The mounting portion is mountable on a rear portion of an aircraft so that the cantilevered portion can extend forwardly underneath the aircraft.

14 Claims, 1 Drawing Sheet

CANTILEVERED HELICOPTER SKID

BACKGROUND AND SUMMARY OF THE INVENTION

The present invention relates generally to a new and unique construction of a landing apparatus intended for use with rotary wing aircraft. More specifically, the invention relates to a cantilevered landing skid for use with a helicopter, which signifies an improvement, both functionally and aesthetically, over the landing skid designs presently in use with the prior art.

Landing mechanisms, devices and apparatuses for use with both fixed and rotary wing aircraft are well known in the relevant art, as is evident, for example, from the following United States patents.

| Arnoux | 1,025,941 | 05/07/12 |
|---|---|---|
| Zahm | 1,358,603 | 11/09/20 |
| Roe | 1,362,511 | 12/14/20 |
| de la Cierva | Re. 18,002 | 03/17/31 |
| Reel | 1,872,811 | 08/23/32 |
| Ringnel | 2,340,080 | 01/25/44 |
| Green | Des. 170,193 | 08/18/53 |
| Lovercheck | 3,104,084 | 09/17/63 |

Many different constructions of aircraft landing gear and mechanisms have been employed over the years. The patent of Michel, U.S. Pat. No. 4,196,878, discloses aircraft landing gear particularly adapted for use with rotary wing aircraft, such as a helicopter. This patent discloses landing devices which are typical of the prior art. This landing gear comprises two main skids connected to the superstructure of the helicopter by means of a plurality of substantially vertical supports. Each skid has a flexible element which flexes resiliently upon contacting the ground in an attempt to minimize the shock attendant with landing. These flexible elements are used in lieu of other types of damping means which are used to cushion or attenuate the effects of the impact of the skid with the ground.

The landing gear disclosed in the '878 patent may not be desirable to many helicopter users. It does not allow for a sufficiently soft landing character while also restricting forward positioning of the helicopter once the back portion of the landing gear has contacted the ground. This type of landing gear construction may also hinder the aerodynamic nature and performance of the helicopter.

The present invention provides an improved construction of a helicopter landing skid which may be particularly aesthetically pleasing when used with helicopters having stabilizing tail turbines. As will be discussed in detail hereinafter with respect to the drawings, the present invention employs a cantilevered skid extending from the general rear of the aircraft frame forward. As such, the skid is extremely flexible and will function as a spring-like device to cushion landings. The cantilevered skid, constructed and mounted on a helicopter according to the teachings of the present invention, is an improvement over the landing gear of the prior art in that it eliminates the need for vertical cantilevered support struts attaching the skids to the helicopter body.

The present invention provides softer landing characteristics and allows for easier, softer forward positioning. The cantilevered skid may be integral with the frame of the helicopter body and has a center of gravity aligned with the center of gravity of the helicopter body. The present invention could provide improved performance and substantial cost savings over present helicopter skid constructions.

OBJECTS AND SUMMARY OF THE INVENTION

A general object of the invention is to provide a new and improved construction of a cantilevered helicopter landing skid.

A more specific object of the present invention is to provide a cantilevered helicopter landing skid having a mounting portion and a cantilevered portion, with the mounting portion connected to a rear end of the helicopter body and the cantilevered portion extending from the mounting portion forward underneath the helicopter body.

Another object of the invention is to provide a cantilevered helicopter landing skid which is more aesthetically pleasing than other, currently available helicopter landing skids.

A further object of the present invention is to provide a cantilevered helicopter landing skid which allows for softer, more easily executed forward positioning of the helicopter.

An additional object of the invention is to provide a cantilevered helicopter landing skid which allows for easy correction of a misplaced landing or forward placement.

Another object of the present invention is to provide a cantilevered helicopter landing skid having a center of gravity which is aligned with a center of gravity of the helicopter body.

A further object of the invention is to provide a cantilevered helicopter landing skid which is integral with the frame of the helicopter body.

An additional object of the present invention is to provide a cantilevered helicopter landing skid which does not require the use of vertical support struts.

Another object of the invention is to provide a cantilevered helicopter landing skid which is less expensive than other, currently available helicopter landing gear.

A further object of the present invention is to provide a cantilevered helicopter landing skid which is more aerodynamic than other, currently available helicopter landing skids.

An additional object of the present invention is to provide a cantilevered helicopter landing skid having wire cutters.

Another object of the present invention is to provide a cantilevered helicopter landing skid which provides a location for wire cutters which is more structurally and functionally ideal than that of other, currently available helicopter landing skids.

A further object of the invention is to provide a cantilevered helicopter landing skid which allows the helicopter to pivot about it during the landing process to achieve proper forward positioning.

A cantilevered helicopter landing skid, constructed according to the teachings of the present invention, comprises a substantially J-shaped cantilevered landing skid having a cantilevered portion and a mounting portion. The cantilevered portion is attached at one end thereof to the mounting portion and extends substantially perpendicularly away the mounting portion. The mounting portion is mountable on a rear portion of an aircraft so that the cantilevered portion can extend forwardly underneath the aircraft.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF A PREFERRED EMBODIMENT

Figure 1:
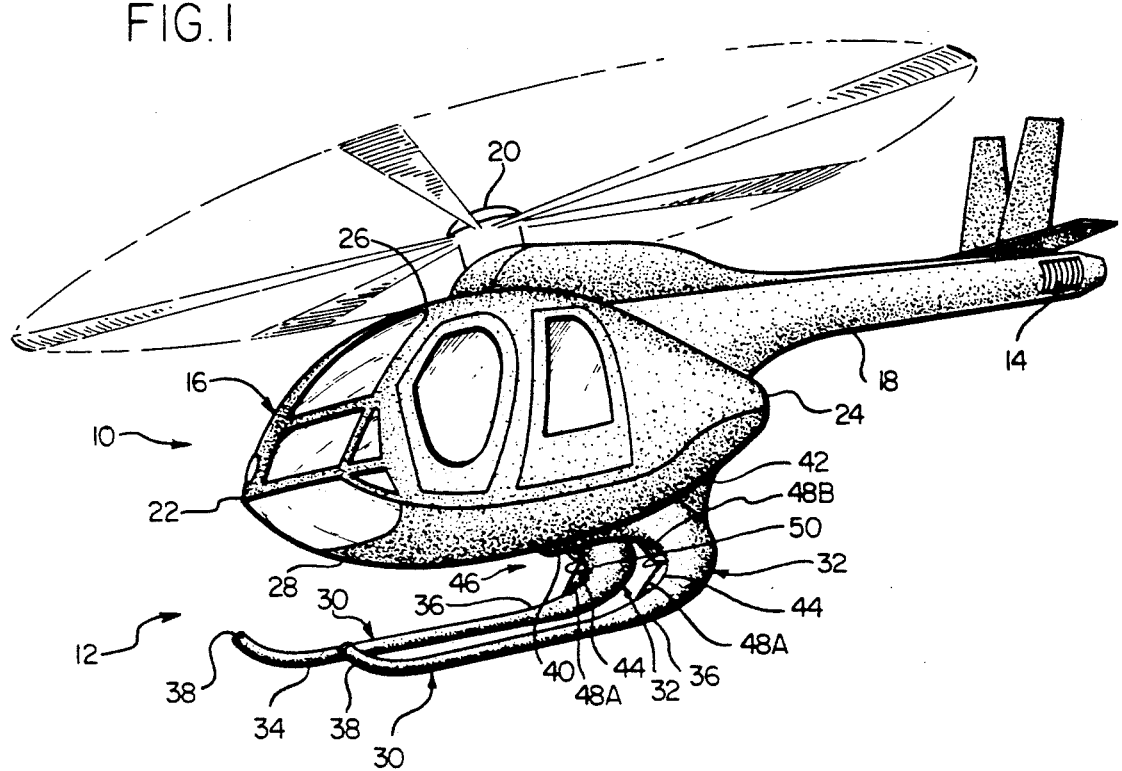
FIG. 1 is a perspective view of a tail-turbine helicopter having a cantilevered helicopter landing skid, constructed according to the teachings of the present invention, showing the unique construction and mounting thereof.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring generally to FIG. 1, a tail-turbine helicopter 10 having a landing member or cantilevered landing skid 12, constructed according to the teachings of the present invention, is illustrated. The helicopter 10 is of a rather recent construction in that the usual stabilizing tail rotor has been replaced by a stabilizing jet turbine 14. The the emissions of the jet turbine 14 can be directed, so that the jet turbine 14 performs the same function as the tail rotor, so that the functioning of the helicopter is substantially similar to helicopters in the prior art. While the construction of the helicopter 10 is relatively new, persons skilled in the relevant art are quite familiar with this construction. Also, while the invention is illustrated and will be discussed in relation to the tail-turbine helicopter 10, it is to be understood that the cantilevered landing skid 12 can be used with any type of helicopter or other aircraft which achieve similar landing characteristics.

Generally, the helicopter 10 comprises a body 16, a tail 18, and a rotor 20. The construction of all of these elements is well known in the art. The body 16 has a front end 22, a back end 24, a top 26, and a bottom 28. The body 16 is of sufficient size to house passengers as well as the equipment necessary to achieve helicopter flight. The rotor 20 is mounted on the top 26 of the body 16 and the landing skid 12 depends from the bottom 28 of the body 16. The tail 18 extends rearward from the back end 24 of the body 16, and the turbine 14 is located on an end of the tail 18 opposite to an end thereof attached to the body 16.

A helicopter 10 usually bears two landing skids 12, each depending from the bottom 28 of the body 16 on opposite lateral sides thereof, as shown in FIG. 1, in order to give the helicopter 10 sufficient stability and support during the landing process and also when the helicopter is stationary on the ground. The two landing skids 12 illustrated in FIG. 1 are constructed similarly, and accordingly, the particularly novel construction thereof will be discussed in the following paragraphs with respect to only one skid 12. However, it is to be understood that the following disclosure applies equally to both landing skids 12 shown in FIG. 1.

The cantilevered landing skid 12 is substantially J-shaped, and generally comprises a cantilevered portion 30 and a mounting portion 32. The cantilevered portion 30 generally includes the straight part of the J-shaped configuration, and the mounting portion 32 generally comprises the rounded portion of the J-shaped configuration. Accordingly, the cantilevered portion 30 is substantially linear and straight, whereas the mounting portion 32 is substantially arcuate or curved in nature. The cantilevered portion 30 is attached to and extends substantially transversely away from the mounting portion 32. When the landing skid 12 is properly mounted to the bottom 28 of the body 16 proximate to the back end 24 thereof, the cantilevered portion 30 is substantially horizontal and parallel to the bottom 28 of the body 16, while the mounting portion is substantially vertical in an arcuate fashion. With this construction, the cantilevered portion 30 is disposed below the bottom 28 of the body 16 of the helicopter 10 a certain distance defined by the mounting portion 32.

The cantilevered portion 30 has a latitudinal cross section substantially smaller than a corresponding cross section of the mounting portion 32. The cantilevered portion 30 is resiliently flexible and has at least a first end 34 and a second end 36 which oppose each other. The cantilevered portion 30 is joined to the mounting portion 32 at the second end 36, the other end 34 being free extending.

The cantilevered portion 30 departs from its substantially linear and straight nature at the first end 34. Specifically, the cantilevered portion 30 turns upwardly at an angle towards the bottom 28 of the body 16 to form an arcuate portion 38 which extends upwardly a certain distance. The arcuate portion 38 does not extend completely from the first end 34 to the bottom 28 of the body 16, however, so that the landing skid 12 presents an open configuration in the direction of travel of the helicopter. This may improve the aerodynamics of the helicopter 10, and also presents other functional benefits, as will be discussed herein. The arcuate portion 38 helps to prevent the landing skid 12 from becoming caught under or by an object when it is flying or during the landing process. The arcuate portion 38 may also contribute to the aerodynamic character of the landing skid 12.

At the second end 36, the cantilevered portion 30 is joined to the mounting portion 32 which has a latitudinal cross section substantially similar to a corresponding cross section of the cantilevered portion 30 at that point. This construction gives the landing skid 12 a clean, smooth look and also contributes to the aerodynamics of the landing skid 12.

Figure 2:
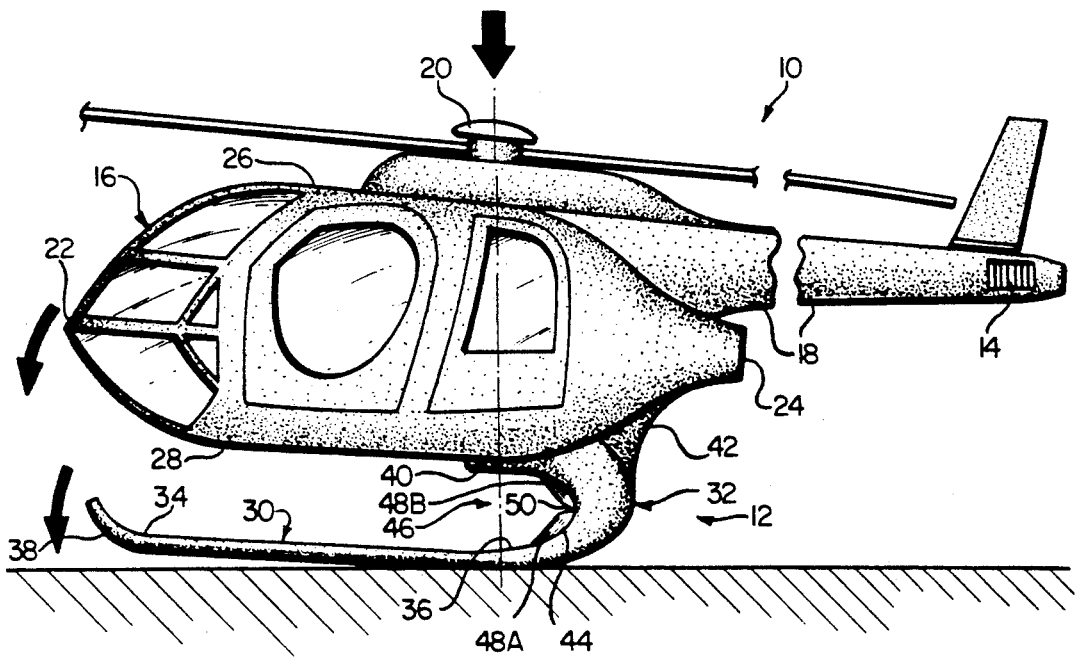
FIG. 2 is a fragmentary side elevational view of the helicopter of FIG. 1, showing the helicopter pivoting on the rear part of the cantilevered portion of the landing skid during the landing process to achieve proper forward positioning.

As the mounting portion 32 curves upwardly from the second end 36 of the cantilevered portion 30 towards the bottom 28 of the body 16, the latitudinal cross section thereof increases steadily to form a aircraft mount 40. The aircraft mount 40 is attachable to the bottom 28 of the body 16 of the helicopter 10 by suitable attaching means, such as bolts and the like. The aircraft mount 40 is disposed on the bottom 28 of the body 16 so that the center of gravity of the landing skid 12 is aligned with the center of gravity 11 of the helicopter 10 itself, thereby providing greater balance, as shown in FIG. 2.

In some embodiments, the aircraft mount 40 can be integral with the frame of the body 16 of the helicopter 10 to provide greater support to the body 16 and the landing skid 12. In order to provide additional support to the mounting portion 32, a support member 42 is provided which communicates from the bottom 28 of the body 16 to the mounting portion 32.

As the mounting portion 32 curves upwardly towards the bottom 28 of the body 16, it forms a forwardly facing concave area 44. This concave area 44, along with the arcuate nature of the mounting portion 32, provides the landing skid 12 and the helicopter 10 with a spring-like resiliency, as will be discussed herein, during the landing process which allows for a softer landing character and easier front positioning.

The concave area 44, combined with the open face presented by the landing skid 12 in the direction of helicopter travel, provides an ideal location for disposition of cutting means in the form of a wire cutter 46. The wire cutter 46 comprises at least two blade portions 48A and 48B constructed so as to be able to cut wires and the like. The blade portions 48A and 48B are substantially congruent and are separated by a notch 50. The blade portions 48A and 48B form mutual substantially mirror images about the notch 50. The blade portions 48A and 48B have sharp edges which slope inwardly towards the notch 50 in order to direct wires thereto. In this fashion, wires can be weakened by their movements along the sharp edges and can be finally cut by an encounter with the notch 50.

In operation, the wire cutter 46 performs as follows. Because the landing skid 12 presents an open face into the direction of helicopter travel, any wires, or other suitable objects, in its path can enter the space between the bottom 28 of the body 16 of the helicopter 10 and the arcuate portion 38. The forward motion of the helicopter 10 brings the wires rearwardly towards the mounting portion 32. Due to the arcuate nature of the mounting portion 32, the wires are lead against the sharp edges of the wire cutter blade portions 48A and 48B. The sharp edges either cut or substantially weaken the structural integrity of the wires at certain locations. Because the sharp edges slope inwardly towards the notch 50, the wires are drawn into the notch 50 by the forward motion of the helicopter 10, thereby cutting the wires, if they have not already been cut.

The operation, as well as the functional benefits, of the cantilevered landing skid 12 will become more clear in the following paragraphs. Referring to FIG. 2, a helicopter 10 having a landing skid 12 is illustrated during the landing process. When a helicopter 10 is properly landed, the rear portion of the landing gear strikes the ground first, and then the front portion of the landing gear is lowered into a proper forward position. Such a landing is illustrated here.

Specifically, the helicopter descends until the cantilevered portion 30 proximate to the second end 36 thereof of the landing skid 12 contacts the ground 52. At this point, as shown in FIG. 2, the first end 34 of the cantilevered portion 30 is still disposed a certain distance above the ground 52.

As the cantilevered portion 30 contacts the ground 52, the weight of the helicopter 10, as well as the force attendant with its descent, flexes the mounting portion 32, thereby decreasing the distance between the bottom 28 of the body 16 and the cantilevered portion 30, which also can flex. However, the mounting portion 32 has sufficient resiliency to return towards it original condition, thereby restoring the rest distance between the bottom 28 of the body 16 and the cantilevered portion 30.

Due to the construction or flexible nature of the cantilevered portion 30 and the mounting portion 32, the landing skid 12 acts like a spring, thereby softening the landing character of the helicopter 10. This results in greater comfort to the passengers as well as increasing the operative safety of the helicopter 10. The co-linear disposition of the centers of gravity of the helicopter 10 and the landing skid 12 also contribute to these desirable aspects.

Furthermore, because of the spring action of the landing skid 12, a pilot operating the helicopter 10 will find it easier to achieve a soft and accurate forward positioning of the aircraft. Specifically, as the mounting portion 32 returns towards its original condition, the body 16 of the helicopter 10 is forced upwardly a certain amount. This raising of the body 16 gives the pilot sufficient clearance to be able to pivot the entire helicopter 10 about the point of contact or pivot point 54 between the cantilevered portion 30 and the ground 52. This allows the pivot to properly front position the helicopter 10 easily.

The landing skid 12, constructed and mounted on a helicopter 10 according to the teachings of the present invention, is a significant improvement over the landing gear present in the prior art. The landing skid 12 eliminates the need for a plurality of vertical support struts and provides an ideal location for the disposition of wire cutters 46. The landing skid 12 increases the aerodynamic and aesthetic characteristics of the helicopter while also providing for a softer landing and easier forward positioning.

While preferred embodiments of the present invention is shown and described, it is envisioned that those skilled in the art may devise various modifications of the present invention without departing from the spirit and scope of the appended claims. The invention is not intended to be limited by the foregoing disclosure, but only by the following appended claims.

I claim:

1. A landing apparatus for rotary wing aircraft having a rear portion, a frame, and a cabin, the landing apparatus comprising: a pair of substantially J-shaped cantilevered landing skids, each having a cantilevered portion and a mounting portion; each cantilevered portion being attached at one end thereof to a mounting portion and extending substantially transversely away from said mounting portion; and each mounting portion being mountable on the rear portion of the aircraft so that each cantilevered portion can extend forwardly underneath the aircraft frame and cabin.

2. A landing apparatus for aircraft as defined in claim 1 wherein each mounting portion has a substantially arcuate configuration defining a concave portion.

3. A landing apparatus for aircraft as defined in claim 1 wherein each mounting portion is flexible and has sufficient resiliency to return to an original condition.

4. A landing apparatus for aircraft as defined in claim 2 further comprising cutting means disposed in the concave portion.

5. A landing apparatus for aircraft as defined in claim 4 wherein the cutting means comprises a plurality of blade portions having sharp edges separated by a notch.

6. A landing apparatus for aircraft as defined in claim 1 further comprising an arcuate portion disposed on each cantilevered portion on an end thereof opposite to the end attached to a mounting portion.

7. A landing apparatus for aircraft as defined in claim 1 further comprising a support member connected between each mounting portion and the aircraft.

8. A landing apparatus for aircraft as defined in claim 1 wherein each mounting portion terminates at an aircraft mount attachable to the aircraft at an end thereof opposite to an end attached to the cantilevered portion, and has a latitudinal cross section which increases in size progressively from the end attached to the cantilevered portion to the aircraft mount.

9. A landing apparatus for aircraft as defined in claim 1 wherein each landing skid has a center of gravity aligned with a center of gravity of said aircraft.

10. A landing apparatus for aircraft as defined in claim 1 wherein each landing skid is integral with the frame of said aircraft.

11. A landing apparatus for aircraft as defined in claim 1 wherein each landing skid forms a pivot point upon contact with ground about which the aircraft can be pivoted.

12. A landing apparatus for rotary wing aircraft having a rear portion, the landing apparatus comprising: a substantially J-shaped cantilevered landing skid having a cantilevered portion and a mounting portion; the cantilevered portion comprising a substantially linear portion of the J-shaped configuration; the mounting portion comprising a substantially arcuate portion of the J-shaped configuration; the cantilevered portion being attached at one end thereof to the mounting portion and extending substantially transversely away from the mounting portion; the mounting portion being mountable on the rear portion of said aircraft so that the cantilevered portion can extend forwardly underneath the aircraft; and the cantilevered portion being resiliently flexible to cushion landing of said aircraft.

13. A landing skid for rotary wing aircraft, the skid being adapted for affixation to an aircraft frame in conjunction with a similar skid of like design disposed in parallel spaced relation, the skid being of a substantially J-shaped configuration and comprised of a mounting portion adapted for affixation to the aircraft and being of a generally arcuate configuration, and a cantilevered portion extending from the arcuate portion, the cantilevered portion being resiliently flexible and having one end affixed to the arcuate portion and an opposite end free extending.

14. A landing apparatus for rotary wing aircraft having a rear portion, a frame and a cabin, the landing apparatus comprising: a substantially J-shaped cantilevered landing skid having a cantilevered portion and a mounting portion; the cantilevered portion being attached at one end thereof to the mounting portion and extending substantially transversely away from the mounting portion; and the mounting portion being mountable on the rear portion of said aircraft so that the cantilevered portion can extend forwardly underneath the aircraft frame and cabin.

* * * * *